J. M. LORENZ.
ELECTRICAL BONDING DEVICE OR RAIL CONNECTOR.
APPLICATION FILED SEPT. 16, 1910.
1,013,029.
Patented Dec. 26, 1911.
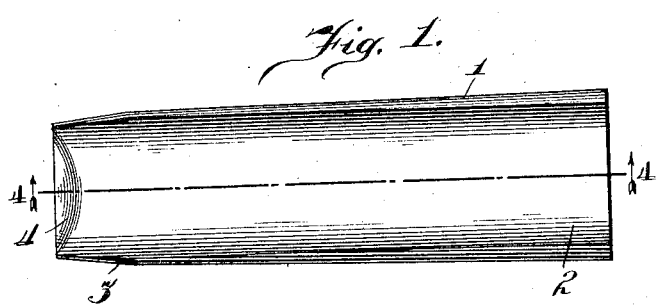
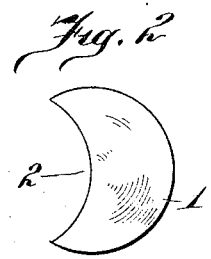
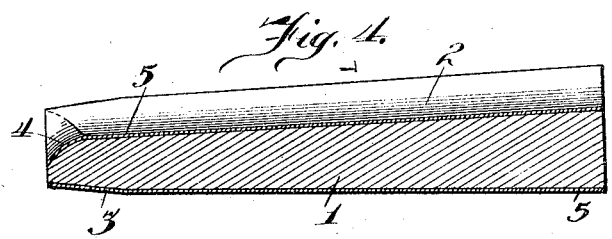
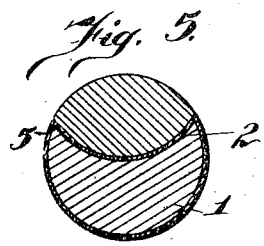
Witnesses
Milton Lenoir
Nelly B. Dearborn
Inventor
Jacob M. Lorenz
Attorneys

UNITED STATES PATENT OFFICE.

JACOB M. LORENZ, OF CHICAGO, ILLINOIS.

ELECTRICAL BONDING DEVICE OR RAIL-CONNECTOR.

1,013,029.   Specification of Letters Patent.   Patented Dec. 26, 1911.

Application filed September 16, 1910. Serial No. 582,310.

*To all whom it may concern:*

Be it known that I, JACOB M. LORENZ, a citizen of the United States, residing at Chicago, in the county of Cook and State of Illinois, have invented certain new and useful Improvements in Electrical Bonding Devices or Rail-Connectors, of which the following is a specification.

This invention relates to improvements in electrical bonding devices or rail connectors of that type in which a wire forms the bond or conductor, the ends of the wire being inserted in holes in the proximate ends of track rails or the like, and secured therein by grooved bonding pins driven into the holes in the rail alongside of the ends of the bond. Many different shapes of bonding pins pertaining to this same general class have heretofore been invented or devised, but practical use has apparently demonstrated that those forms in which the pin is provided with an open groove in its side for the reception of the bonding wire, and in which the pin is of substantially larger cross sectional area than the wire, are best. So also it has been apparently proved that the pin must be tapered practically throughout its length so as to provide a driving fit, which will become tighter and tighter as the pin is forced farther and farther into the rail, in order to secure best results.

Most of the pins of the prior art which have open grooves are designed for use with ordinary round wire bonds, and it follows that the pin and bond when assembled in readiness for driving into the hole of the rail do not together form a body which is accurately round in cross section, but must be swaged or sheared off as they are driven into the rail, if the rail aperture is to be completely filled. It is of the utmost importance that the pin and bond should together accurately fill the hole so as to form a hermetically closed joint, because otherwise moisture creeps into the joint and an already imperfect electrical contact is rapidly still further impaired by the effects of corrosion. There is in existence, however, in the prior art one form of grooved bonding pin which is designed for use in conjunction with a bonding wire of equilateral triangular form, the sides of the triangle being formed on the same curvature as the sides of the bonding pin, and the bonding pin being provided with a channel or groove conforming in size and shape to the cross sectional form of the bonding wire. My present invention embodies improvements on this latter species of pin.

Among the salient objects of the present invention are to provide a grooved bonding pin and coöperative bonding wire of such construction that the wire fits the groove of the pin and forms such a complement to the latter as to practically restore it to ungrooved condition, the cross sectional shape of the bonding pin being nevertheless such that it may be readily formed by swaging; to provide a construction in which the bonding pin may be readily started and driven in alongside of the bonding wire without carrying the wire inwardly with the pin, thus effecting a material economy in length of bonding wire and obviating the chances of breaking the wire or impairing the previously made connection at the opposite end thereof; to provide a form of bonding pin which may be made from solid drawn non-corrosive-metal-clad wire, or rod stock, and swaged into final form without destroying the integrity of the soft metal coating; and in general, to provide improvements in devices of the character referred to.

The invention will be readily understood from the following description, reference being had to the accompanying drawing, in which—

Figure 1 is a plan view of the pin, looking at the channel side thereof; Fig. 2 is an elevation of the larger end of the pin; Fig. 3 is an elevation of the smaller end of the pin; Fig. 4 is a longitudinal sectional view, taken on line 4—4 of Fig. 1; Fig. 5 is a cross sectional view of the pin and bonding wire in assembled relation; Figs. 6 and 7 end and side elevation views, respectively, of a piece of the bonding wire.

In the preferred embodiment of my invention shown in the drawing, 1 designates as a whole a pin which is slightly tapered throughout its length and provided with an open groove 2 of approximately uniform depth extending throughout the full length thereof. The exterior of the pin is uniformly tapered throughout its main length but for a short distance at its smaller end is more abruptly tapered, as indicated at 3; this abruptly tapered portion being provided to facilitate the entrance of the pin in the hole of the rail. The groove 2, while of uniform width and approximately uniform depth throughout its main length, is at the smaller end of the pin, at its bottom side of the groove, deepened, preferably in the form of a slightly rounded bevel, as indicated at 4; the object of this deepening being to permit the point of the pin to be driven in alongside of the bonding wire already placed in the hole of the rail without engaging the bonding wire in such manner as to force the latter inwardly with the pin. That is to say, the rounding or beveling of the groove at 4 removes the angle which would otherwise be present and dig into the bonding wire when the pin is just being started. The bottom of the groove of the pin throughout the main length of the latter is formed on a radius substantially the same as the diametral radius of the pin itself. Of course, since the pin is tapering throughout this cannot be accurately true except as to one particular diameter of the pin, but inasmuch as the taper of the pin throughout its main length is very slight, the above statement is substantially accurate. It will be obvious that the cross sectional form of the bonding wire which will fit in such a groove and form a complement to the body of the pin so that the two parts together will exteriorly have the form of a round, slightly tapered pin, will be elliptical in cross section, that both sides of the bonding wire will be of the same curvature, that the longer diameter of the bonding wire will correspond to the maximum width of the groove, and that the shorter diameter of the bonding wire will be equal to twice the actual depth of the groove in the pin. I prefer to make the shorter diameter of the bonding wire equal to the diameter radius of the bonding pin, in which event, of course, the bottom of the groove will practically coincide with the axial center of the bonding pin at that particular cross sectional point, taken as the diametral radius upon which the bottom of the groove is formed. However, the size of the bonding wire relatively to the size of the bonding pin may be varied considerably from the preferred proportions stated without seriously impairing the utility of the device. By reason of the comparatively flat curvature of the bottom of the groove, and therefore relatively shallow depth of the latter, these bonding pins may be swaged from solid stock by the use of suitable dies, and this being true I am enabled to employ steel stock which has been clad or coated with tin or copper, and accomplish the swaging and shaping of the pins without destroying the integrity of the coating as to the side surfaces of the pin. Accordingly in the cross sectional view a coating 5 is indicated as covering the exterior of the bonding pin including the surface of the groove. The bonding wire ordinarily employed is copper, and therefore requires no coating.

The advantages of employing the non-corrosive soft metal coating on bonding pins are well understood in this art, and need not therefore be detailed.

It will be understood from the foregoing description that the invention may be otherwise embodied than in the specific details set forth, and accordingly I do not wish to be limited in the interpretation of my claims, except in so far as the terms thereof are specific.

I claim as my invention:

1. A bonding pin, externally round in cross section, except for a groove in one side thereof, and provided with an open longitudinally-disposed groove of practically uniform width and depth throughout the main body of the pin, the bottom of said groove being curved in cross section on practically the same radius as the diametral radius of the pin body.

2. A bonding pin of the character described, tapered throughout its chief length, and provided with an open longitudinally-disposed bond-receiving groove of approximately uniform width and depth throughout the main body of the pin, the bottom of said groove being curved in cross section on practically the same radius as the diametral radius of the pin body.

3. A bonding pin, externally round in cross section, except for a groove in one side thereof, and provided with an open longitudinally-disposed groove of practically uniform width and depth throughout the main body of the pin, the bottom of said groove being the curved in cross section on practically the same radius as the diametral radius of the pin body, and a bonding wire adapted to fit the groove of said pin, the end of said wire being elliptical in cross section, its two sides being curved on the same radius as is the bottom of the pin-groove and its longer transverse axis practically equal to the width of said groove.

4. As a new article of manufacture, a bonding pin externally round in cross section except for the groove in one side thereof, provided with an open longitudinally disposed groove extending throughout the length of the pin, said pin body being provided as to its sides and internal surface of the groove with a drawn metal jacketing of substantially non-corrosive metal.

JACOB M. LORENZ.

Witnesses:
ALBERT H. GRAVES,
EMILIE ROSE.